(12) United States Patent
Alon et al.

(10) Patent No.: US 7,617,320 B2
(45) Date of Patent: Nov. 10, 2009

(54) METHOD AND SYSTEM FOR VALIDATING LOGICAL END-TO-END ACCESS PATHS IN STORAGE AREA NETWORKS

(75) Inventors: Roee Alon, Tel Aviv (IL); Assaf Levy, Tel Aviv (IL); Shai Scharf, Tel Aviv (IL); Raphael Yahalom, Boston, MA (US)

(73) Assignee: NetApp, Inc., Sunnyvale, CA (US)

( * ) Notice: Subject to any disclaimer, the term of this patent is extended or adjusted under 35 U.S.C. 154(b) by 728 days.

(21) Appl. No.: 10/693,632

(22) Filed: Oct. 23, 2003

(65) Prior Publication Data

US 2004/0205089 A1 Oct. 14, 2004

Related U.S. Application Data

(60) Provisional application No. 60/420,644, filed on Oct. 23, 2002.

(51) Int. Cl.
*G06F 15/16* (2006.01)
(52) U.S. Cl. .................. 709/229; 709/200; 709/220; 709/223; 707/1
(58) Field of Classification Search .......... 709/200, 709/220, 223, 224, 229; 707/1
See application file for complete search history.

(56) References Cited

U.S. PATENT DOCUMENTS

| | | | |
|---|---|---|---|
| 5,043,866 A | 8/1991 | Myre, Jr. et al. | |
| 5,280,611 A | 1/1994 | Mohan et al. | |
| 5,327,556 A | 7/1994 | Mohan et al. | |
| 5,381,545 A | 1/1995 | Baker et al. | |
| 5,774,377 A | 6/1998 | Eidson et al. | |
| 5,825,772 A * | 10/1998 | Dobbins et al. | 370/396 |
| 5,940,819 A * | 8/1999 | Beavin et al. | 707/2 |
| 6,014,673 A | 1/2000 | Davis et al. | |
| 6,223,176 B1 | 4/2001 | Ricard et al. | |
| 6,233,240 B1 | 5/2001 | Barbas et al. | |

(Continued)

FOREIGN PATENT DOCUMENTS

WO     WO 01/82077     11/2001

(Continued)

OTHER PUBLICATIONS

Data Mobility Group, Storage Management and the Continued Importance of CIM, Jan. 2004, www.datamobilitygroup.com.

(Continued)

*Primary Examiner*—Salad Abdullahi
*Assistant Examiner*—El Hadji M Sall
(74) *Attorney, Agent, or Firm*—Ropes & Gray LLP (57) ABSTRACT

A method and system for validating logical access path in a storage area network is provided. It supports definition of a SAN access path policy that represent which application to data LUN logical access paths should not exist, which should exist, and what should be the end-to-end attributes of each. It performs the SAN-customized graph-based validation algorithm based on information it collects automatically from devices distributed across the SAN using a variety of non-intrusive mechanisms. It enables to identify violations of actual logical access paths relative to the required access paths as determined by the policy. It enables notification about violations, with all their relevant context information, to the appropriate target recipient using a variety of means.

25 Claims, 8 Drawing Sheets

U.S. PATENT DOCUMENTS

| | | | |
|---|---|---|---|
| 6,240,463 | B1 | 5/2001 | Benmohamed et al. |
| 6,327,598 | B1 | 12/2001 | Kelley et al. |
| 6,347,335 | B1 | 2/2002 | Shagam et al. |
| 6,434,626 | B1 | 8/2002 | Prakash et al. |
| 6,636,981 | B1 | 10/2003 | Barnett et al. |
| 6,691,169 | B1 | 2/2004 | D'Souza |
| 6,751,228 | B1 | 6/2004 | Okamura |
| 6,792,503 | B2 | 9/2004 | Yagi et al. |
| 6,795,399 | B1 | 9/2004 | Benmohamed et al. |
| 6,816,927 | B2 | 11/2004 | Bouchet |
| 6,904,143 | B1 | 6/2005 | Peterson et al. |
| 6,909,700 | B1 | 6/2005 | Benmohamed et al. |
| 7,051,029 | B1 | 5/2006 | Fayyad et al. |
| 7,058,702 | B2 * | 6/2006 | Hogan ................... 709/220 |
| 7,062,559 | B2 | 6/2006 | Yoshimura et al. |
| 7,069,480 | B1 | 6/2006 | Lovy et al. |
| 7,103,653 | B2 * | 9/2006 | Iwatani ................... 709/223 |
| 7,103,712 | B2 | 9/2006 | Mizuno |
| 7,120,654 | B2 | 10/2006 | Bromley |
| 7,127,633 | B1 | 10/2006 | Olson et al. |
| 7,149,886 | B2 * | 12/2006 | Fujibayashi et al. ............ 713/1 |
| 7,194,538 | B1 * | 3/2007 | Rabe et al. ................ 709/224 |
| 7,260,628 | B2 | 8/2007 | Yamamoto et al. |
| 7,376,937 | B1 | 5/2008 | Srivastava et al. |
| 7,380,239 | B1 | 5/2008 | Srivastava et al. |
| 7,512,954 | B2 | 3/2009 | Srivastava et al. |
| 2002/0145981 | A1 | 10/2002 | Klinker et al. |
| 2003/0005119 | A1 | 1/2003 | Mercier et al. |
| 2003/0018619 | A1 | 1/2003 | Bae et al. |
| 2003/0055932 | A1 | 3/2003 | Brisse |
| 2003/0131077 | A1 | 7/2003 | Hogan |
| 2003/0191992 | A1 | 10/2003 | Kaminsky et al. |
| 2003/0237017 | A1 | 12/2003 | Jibbe |
| 2004/0019833 | A1 | 1/2004 | Riedl |
| 2004/0030768 | A1 | 2/2004 | Krishnamoorthy et al. |
| 2004/0075680 | A1 | 4/2004 | Grace et al. |
| 2004/0243699 | A1 | 12/2004 | Koclanes et al. |
| 2005/0044088 | A1 | 2/2005 | Lindsay et al. |
| 2005/0097471 | A1 | 5/2005 | Faraday et al. |
| 2005/0114403 | A1 | 5/2005 | Atchison |
| 2005/0160431 | A1 | 7/2005 | Srivastava et al. |
| 2006/0143492 | A1 | 6/2006 | LeDuc et al. |
| 2007/0094378 | A1 | 4/2007 | Baldwin et al. |
| 2007/0112883 | A1 | 5/2007 | Asano et al. |

FOREIGN PATENT DOCUMENTS

| | | |
|---|---|---|
| WO | WO 02/088947 | 11/2002 |
| WO | WO 02/089014 | 11/2002 |
| WO | WO 03/054711 | 7/2003 |
| WO | WO-2004111765 | 12/2004 |

OTHER PUBLICATIONS

Information Lifecycle Management: An Automated Approach. Technical White Paper. EMC2 (Dec. 8, 2003).

Kasten Chase Unveils Advanced Security Architecture, www.gridtoday.com/02/101/100546.html, Oct. 14, 2002.

Kasten Chase, Assurency (2002.

Radiantdata, White Paper, Radiant Data Server Technology Overview, (2003).

Fujitsu—Softek Sanview—softek.fujitsu.com (May 2002).

Storage Network Management Software—The Critical Enabler of Maximum ROI, Richard R. Lee & Harriet L. Bennet (Dec. 16, 2002).

* cited by examiner

Path List  11:37:47 PM 26/02/03

| Host | IP | Storage | LUN | Capacity | W.I.P. |
|---|---|---|---|---|---|
| Host 1 | 192.1.168.1 | Storage 1 | All | | |
| Host 2 | 192.1.168.2 | Storage 1 | All | | |
| Host 1 | 192.1.168.1 | Storage 2 | All | | |
| Host 2 | 192.1.168.2 | Storage 2 | All | | |
| Host 3 | 192.1.168.3 | Storage 2 | All | | |
| Host 4 | 192.1.168.4 | Storage 2 | All | | |

FIG. 7

FIG. 8

METHOD AND SYSTEM FOR VALIDATING LOGICAL END-TO-END ACCESS PATHS IN STORAGE AREA NETWORKS

CROSS-REFERENCE TO OTHER PATENT APPLICATIONS

This application claims the benefit of U.S. Provisional Patent Application No. 60/420,644, filed Oct. 23, 2002, which is incorporated herein by reference.

BACKGROUND OF THE INVENTION

Storage area networks are dedicated networks for enabling multiple applications on servers access to data stored in consolidated shared storage infrastructures. Enterprises are deploying increasingly large-scale SANs in order to gain economies-of-scale business benefits, and are performing and planning massive business-critical migration processes to these new environments Enterprise SANs are increasingly supporting most of the business critical applications in enterprises. These SAN are increasingly large and complex. A typical SAN environment in a Fortune 500 company may contain a few hundred servers and tens of switches and storage devices of different types. Furthermore these SAN environments are undergoing a large amount of change and growth. According to a recent Gartner survey, large scale SAN are growing on average by about 40% annually.

This large size and rate of growth of SANs leads to huge added complexity. The number of components and links which may be associated with the data transfer from each given application and one or more of its data units (LUNs—stored on one or more shared storage devices) may increase exponentially with the size of the SAN.

This complexity, which is compounded by the heterogeneity of the different SAN devices, leads to high risk and inefficiency. Changes to the SAN (which need to happen often due to the natural growth of the SAN) take a long time to complete by groups of SAN managers, and are error-prone. For example, many existing enterprises a routine change (such as adding a new server to a SAN) may take 1-2 weeks to complete, and a high percentage of these change process (sometime as high as 30-40%) include at least one error along the way. It is estimated that around 80% of enterprise outage events are a result of some infrastructure change related event.

One of the main reasons for these problems in SANs is a consequence of the fact that applications and data luns, the end-points in SAN flows, have a relatively strong exclusive access relationship. That is, Each application on a SAN-connected host typically requires access (often exclusive access) only to some specific SAN data units (LUNs). Consequently, in storage area networks each source end point (application on a host) will typically need to interact only (and often exclusively) with a specific, small minority of target end points (LUNs on storage devices), ever.

However that access relationship and its related access characteristics actually need to be realized by setting up multiple underlying devices of different types. These underlying operations include multiple physical and logical basic set up actions (sometime tens per a single logical change) which need to be set up in different locations and device types, with perfect mutual consistency.

Currently there are no adequate technological solutions to assist the SAN administrators in establishing the end to end consistency of SAN states and change activities, in relation to the application-data requirements. The reality is that SAN administrators currently need to rely on manual methods, spreadsheet based information, and trial and errors.

There are important challenges that need to be overcome for such a technology to be developed. These challenges are related, among others, to the exponential number of potential access routes from application servers to the data storage devices, the high level of heterogeneity among SAN devices, the distributed nature of the required consistent snapshot state, and the fact that various type of events can occur and each can in principle affect any number of application to data flows. Therefore, there is a need for a solution to the problem of validating the end to end SAN state and of SAN state change events.

SUMMARY OF THE INVENTION

A method and system for validating logical access path in a storage area network is provided. It supports definition of a SAN access path policy that represent which application to data LUN logical access paths should not exist, which should exist, and what should be the end-to-end attributes of each. It performs the SAN-customized graph-based validation algorithm based on information it collects automatically from devices distributed across the SAN using a variety of non-intrusive mechanisms. It enables to identify violations of actual logical access paths relative to the required access paths as determined by the policy. It enables notification about violations, with all their relevant context information, to the appropriate target recipient using a variety of means.

Another part of this invention validates the correctness and the impact of any type of SAN event that may affect the SAN state. It collects information about events, either right after they happen, and in some cases before they happen, and analyzes using SAN customized graph-based algorithms their impact on any SAN logical access path and the compliance with the logical access path policy. In case of identified violations notifications with context information are sent if the event has already occurred, or prevents it from happening if is has not.

There are various important advantages to this invention:
  It captures all the important properties of end-to-end logical access paths and helps to enforce them
  It abstracts away much of the underlying complexity
  It can handle all types of SAN change event, planned and unplanned.
  It can prevent many of the problems currently associated with SAN change processes which are due to inconsistency errors
  It can detect many problems right after they occur and provide meaning context information about them to appropriate personnel enabling rapid correction
  It can reduce significantly the amount of time and resources currently required to perform SAN changes
  It can be used as a foundation for a structured well-designed SAN change life-cycle process
  It can serve as a basis for a better controlled, better utilized, more reliable, and more secure SAN environment.

Thus from a enterprise business perspective this technological invention has a big potential to reduce operational costs currently invested in SAN change processes and problem correction, to reduce outage risks due to SAN infrastructure mistakes and failures which are currently quite common, and to enable further SAN growth and change to support the business needs and to enable to provide the strong economic benefits that well designed and well-operated large SAN can provide.

According to an aspect of the invention, a process for validating a state of a storage area network (SAN) includes defining a SAN access path policy representative of SAN logical access paths, wherein the SAN logical access paths defines end-to-end access relationship between an application on a server and data LUNs stored on storage devices in the SAN and having logical access path attributes with attribute values. The process further includes collecting configuration information from devices of the SAN, standardizing formats of the configuration information and reconciling any conflicts, as well as processing the collected configuration information to identify the SAN logical access paths. The process then computes the associated attribute values, compares the identified SAN logical access paths and computed attribute values with the SAN access path policy to identify any logical path discrepancies or violations.

According to another aspect of the invention, a process for validating a state change event of a storage area network (SAN) includes defining a SAN access path policy representative of SAN logical access paths, defining a SAN state based on SAN logical access paths and attribute values associated with the logical access paths, obtaining SAN event description information, and comparing the SAN event description information with the SAN state to identify a any logical path discrepancies or violations.

According to yet another aspect of the invention, a storage area network (SAN) validation manager, includes a policy engine that stores a SAN access path policy representative of SAN logical access paths, wherein the SAN logical access paths defines end-to-end access relationship between an application on a server and data LUNs stored on storage devices in the SAN and has logical access path attributes with attribute values. The SAN validation manager further includes a validation engine that collects configuration information from devices of the SAN, standardizes formats of the configuration information and reconciles any conflicts. The validation engine also processes the collected configuration information to identify the SAN logical access paths and computes the associated attribute values, and compares the identified SAN logical access paths and computed attribute values with the SAN access path policy to identify any logical path discrepancies or violations Advantageous embodiments of the invention may include one or more of the following features. The SAN validation process can further include identifying a logical access path violation if at least one identified SAN logical access path is in disagreement with the SAN access path policy, and defining a SAN notification policy for notifying a user about SAN logical access path violations. Notifying a user can include sending a message to the user with violation information, with the message being an email, a graphic text and/or a SNMP message. The process can further include identifying partial logical access paths, and comparing logical access path values of the partial path with the SAN logical access path policy.

The configuration information can include device properties selected from the group consisting of server ID, server port configuration, switch port configuration, switch ID, switch IP and domain ID, grouping of devices, zoning of devices, storage device ID, LUNs of storage devices, and LUN masks. Logical access path attributes can include attributes selected from the group consisting of level of redundancy, type of redundancy, number of hops, number of allocated ports, bandwidth, component interoperability, proximity constraints, and type of component authentication. The process can also use user-definitions to group of at least two logical access paths that share at least one of the logical path attribute value or are within a range of predefined logical path attribute values. Collecting configuration information can include polling a SAN device API, simulating a CLI session with a SAN device, communicating with a SAN device using a CIM or SNMP protocol.

The process can further validate a change event by collecting SAN event description information, and processing the SAN event description information to identify SAN logical access paths that have attribute values that do not comply with the SAN access path policy, thereby indicating a changed state of the SAN.

A SAN change event can be an erroneous change in a SAN device configuration, a planned change in a SAN device configuration and/or a device failure. The SAN event description can be obtained by at least one of polling, trapping after an event occurs, by a direct administrator input, by an input from a provisioning system about an intended change, by intercepting a change command before an event occurs.

Further features and advantages of the present invention will be apparent from the following description of preferred embodiments and from the claims.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

FIG. 8 shows an exemplary violation screen of the SAN Validation Manager of FIG. 1.

DETAILED DESCRIPTION

A Storage Area Network (SAN) is a network dedicated to enabling multiple applications on multiple servers to access (read and write) data which is stored on multiple shared storage devices. A SAN consists of specialized SAN devices (such as different types of switches) which are interlinked, and is based on a number of possible specialized transfer protocols (such as Fibre Channel and iScsi). Each server is connected to a SAN with one or more specialized network cards (such as an HBA). Application data is stored on a storage device in storage units called LUNs.

Figure 1:
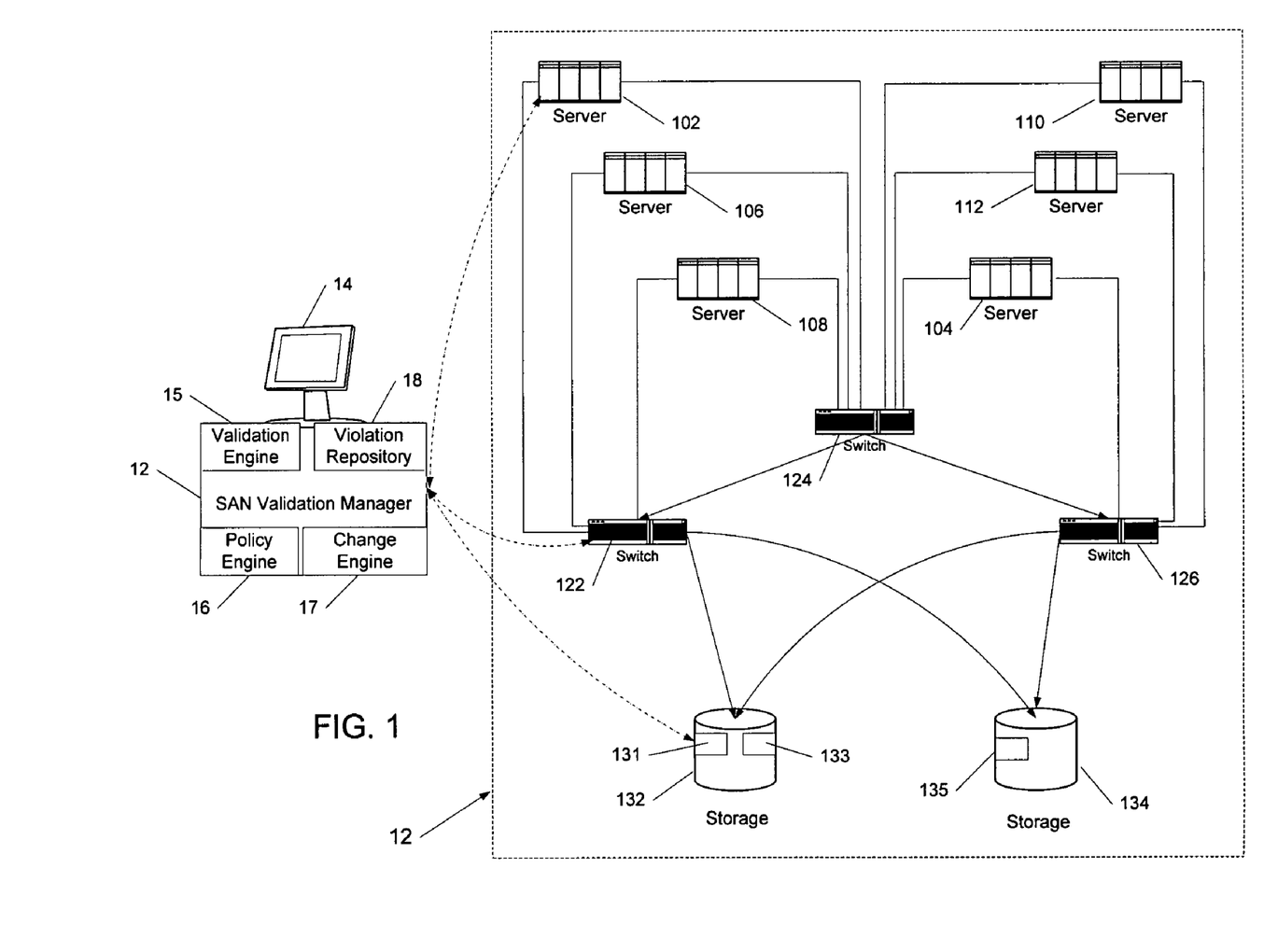
FIG. 1 shows a schematic diagram of an exemplary storage area network (SAN) with physical links and a SAN Validation Manager according to the invention.

FIG. 1 shows a topological view of an exemplary storage area network (SAN) 10 with several SAN peripherals, such as servers 102, 104, 106, 108, 110, 112, switches 122, 124, 126, and application data storage devices 132, 134. The storage devices can be, for example, disk drives, such as RAID devices, tape drives, or other types of mass-storage devices. The physical connection paths between different SAN peripherals are indicated by solid lines. The storage devices 132, 134 can be further partitioned into data storage regions with a unique LUN (logical, unit number) 131, 133, 135.

Figure 2:
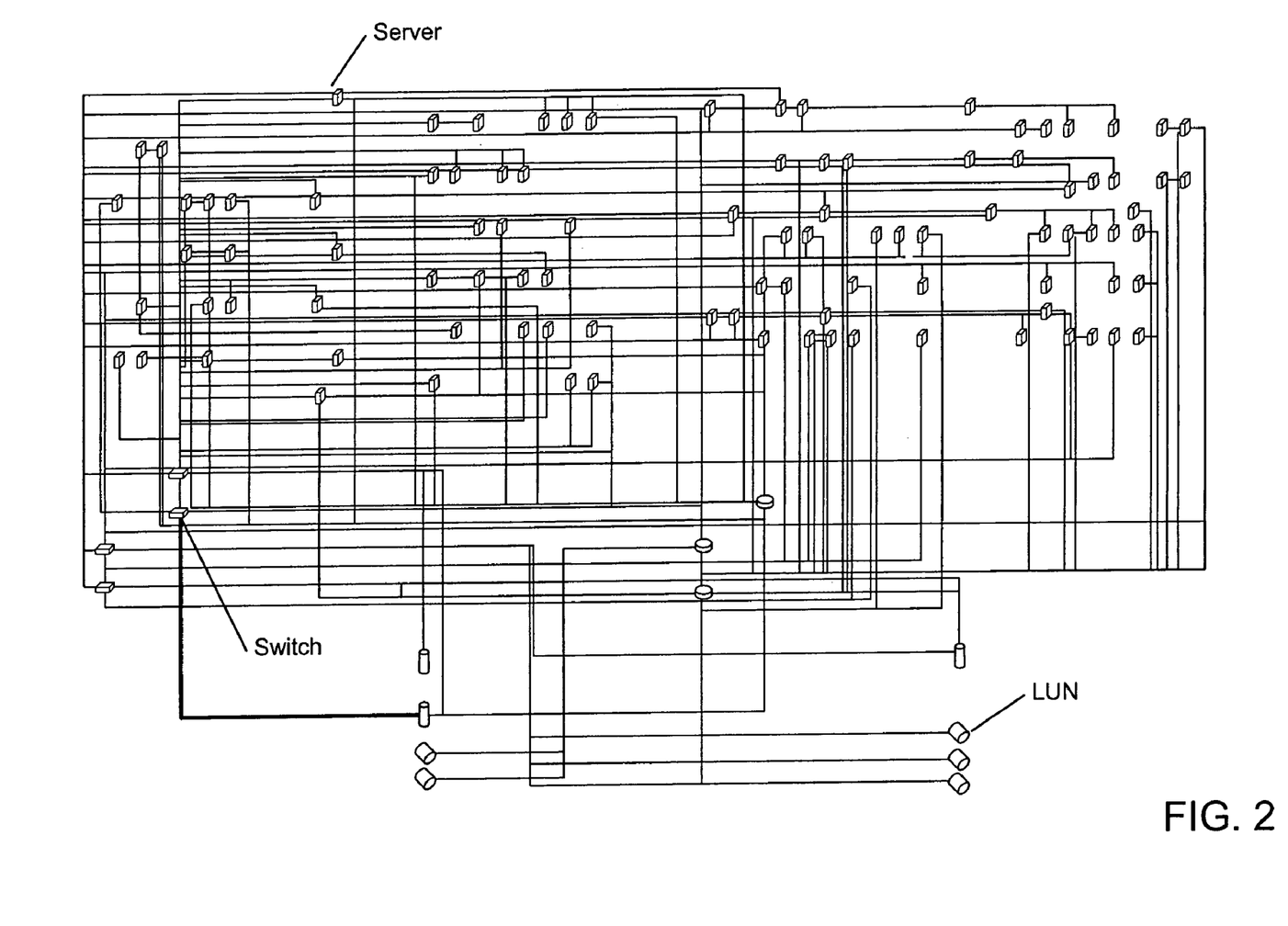
FIG. 2 shows a schematic diagram of a complex small to mid-size SAN.

Existing SANs in medium and large enterprises, as depicted for example in FIG. 2, currently contain hundreds to thousands of connected servers, ten to hundreds of switches and tens to hundreds of storage devices each. Furthermore these environments keep growing rapidly, in some cases doubling every year. In such environments the mesh of devices and links can be very complex and there are exponentially many physical routes between each application and each LUN in a storage device.

Figure 3:
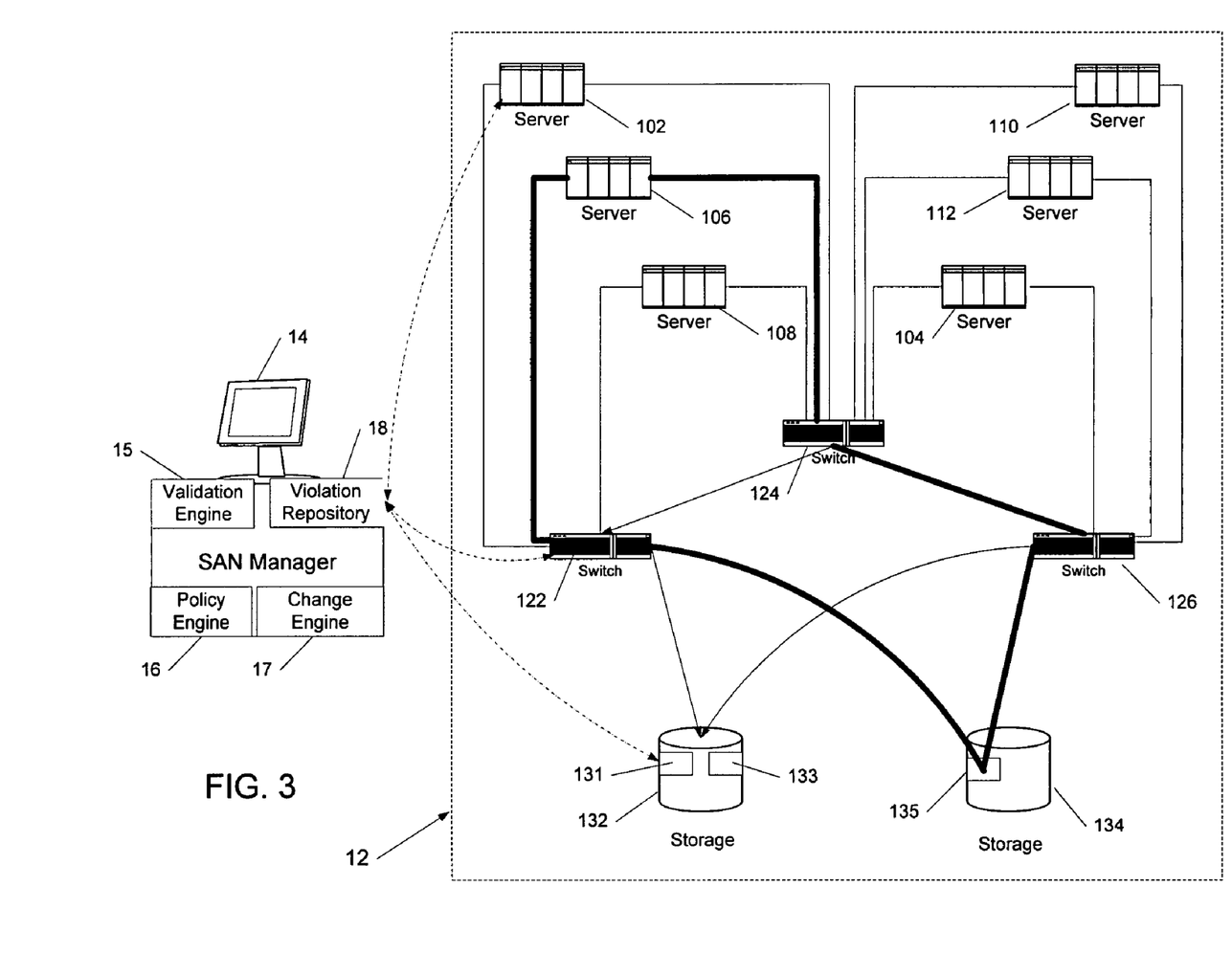
FIG. 3 shows two exemplary logical access path between server and a server that comply with an access policy.

Referring now to FIG. 3, data can flow between an application 106 and stored LUNs, such as LUN 135, on any of the existing physical routes only if all the components along that route are set to enable that application on that server to communicate with that LUN. In particular, each SAN device may be set to logically constrain traffic flows through that device to specific respective end-points only (using different methods depending on the type of device and on the vendor). For example, each switch typically supports the definition of different type of zones which are sets of device ports between which data may flow via that switch. Storage devices typically support LUN masking which imposes constraints on the servers that may access a LUN. Similarly, HBAs typically support types of LUN masking that constrain which LUNs can be accessed from that server.

Consequently for a data flow to be enabled end-to-end from a particular given application to a particular given LUN both physical constraints need to be satisfied (at least one physical path existing between the corresponding server and the corresponding storage) as well as all the variety of logical constraints in all the devices along that route (the zoning in each switch and the LUN masking at the HBA and storage device should be set in a way which does not disable data traffic between these end points).

In the context if this invention, Logical Access Path refers to a logical channel between a given application and a given LUN along which data can flow. In other words, a logical access path is a sequence of components starting with a specific application on a specific server via an HBA, and a sequence of a number (one or more) of switches and physical links, leading to storage controller and a storage device containing a specific LUN, such that the logical state (configuration state) of each component along the way in that sequence (for example the HBA, the storage controller, and each of the switches) is set such as to not disable data flow between that specific application and that specific LUN along that specific sequence.

FIG. 3 highlights a logical path between two end points, in the present example the server 106 and the LUN 135. For each of these logical access paths, not only needs the physically connectivity to exist, but the logical set up on each of the 2 HBAs, the zone set up in each of the switches, and the LUN masking at the storage device all have to be set to enable flows along each of these logical channels between these two end points. For example, the zoning on switch 122 needs to be define such that port corresponding to Server 106 and the one corresponding to the storage device of LUN 135 are in the same zone. Logical access paths can include associated path attributes which can be considered as particular properties which characterize each end-to-end Logical Access Path. As described in detail below, these represent specific characteristics of Logical Access Path, describing, for example, aspects of availability, performance and security of each given end-to-end logical channel. In other words, as will be described below, given a particular logical access path, a particular value can be computed for each one of the defined attributes (that value represents a particular property value for that logical access path instantiation).

The computation of a particular attribute value for a given logical access path can be based on information related to the sequence of linked components, as well as on information about the types and internal configuration states of any number of components contained in that logical access path. These computed values (rather than some low level property of a physical connection or of one device or another) represent the characteristics of the end-to-end data flow between an application and its data (characterizing aspects related to the end-to-end levels of availability, of performance, and of security, characterizing data flows along that logical access path). For this reason, these derived property values of the abstract logical access path play an important role from an application (and so a business enterprise) perspective.

According to one embodiment, logical access paths in a SAN can be determined and validated. The validation process identifies the logical access paths which exist in a specific SAN state, computes the value of each attribute for each of the existing access paths, and compares the identified access paths and computed attribute values with predetermined requirements, as specified in a preset logical access path policy.

Figure 4:
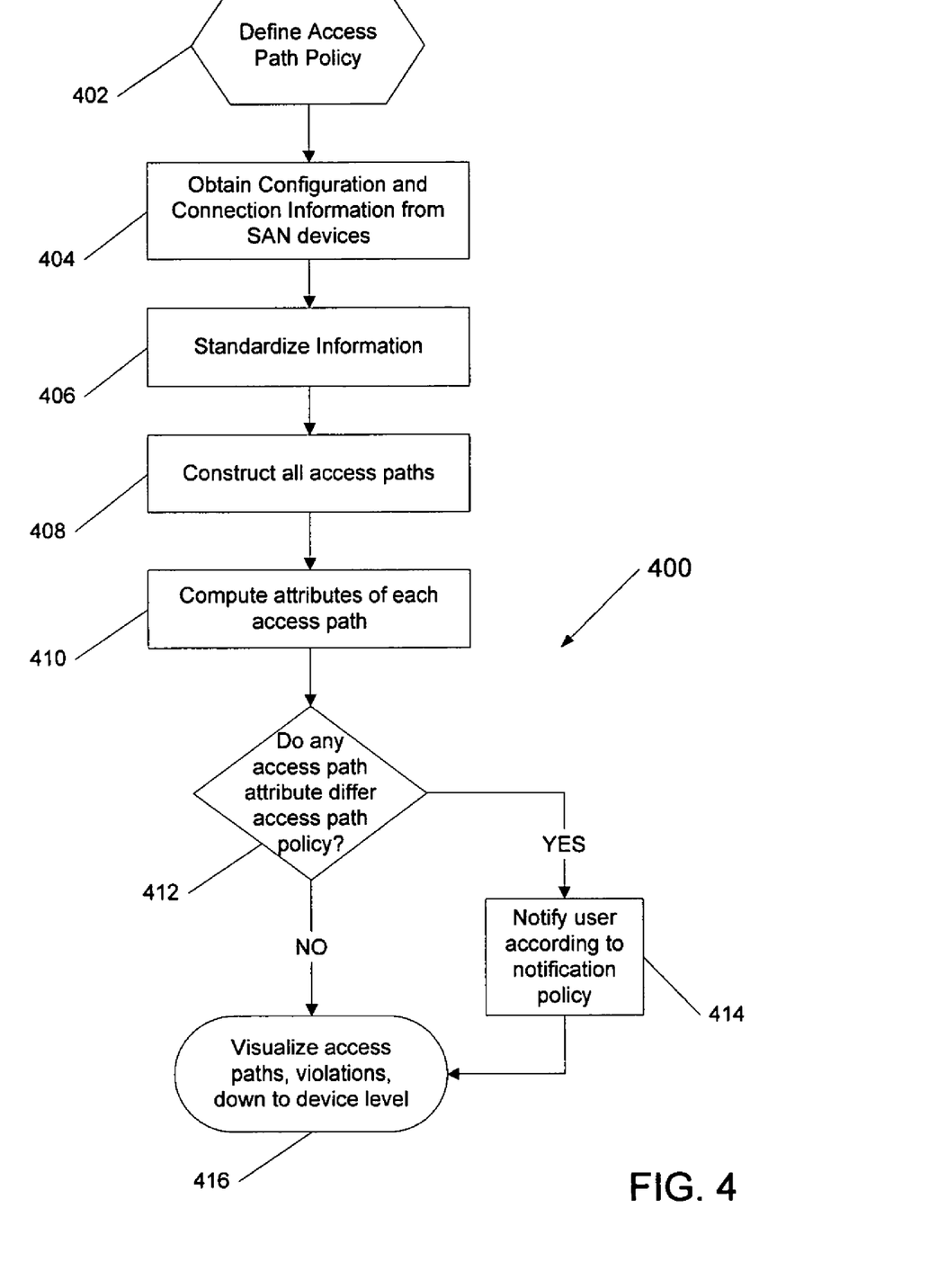
FIG. 4 is a schematic high-level flow diagram for validating a state of a SAN.

FIG. 4 represents an exemplary process flow diagram flow of the validation process 400. In a first step 402 of process 400, a logical access path policy is defined. The policy is represented as a policy data structure stored by the system executing the validation process, for example, in policy engine 16 of SAN manager 12 (FIGS. 1 and 3). The policy (that is the state of the policy data structure) is defined (and/or can be updated) only by authorized personnel who are properly authenticated. The policy contains a list of logical access paths which are required to exist and for each the value that each attribute should have. That list is exclusive, the implications are that any logical access path not on the list should not exist. Each logical access path in the policy is specified by its two end points: application/server id and data/LUN id. Values can be defined in the policy for each access path for any of the following attributes (the definition of each of these attributes and how each is computed will be described below): level of redundancy, type of redundancy, number of hops, number of allocated ports, bandwidth, component interoperability, proximity constraints, and type of component authentication. Logical access paths policy may be set directly by an authorized administration or imported (by an authorized person) from some external source. Required attributes values in the policy may be set by the authorized administrator for each individual access path, or for a (use-defined) group of access paths. The setting of a particular attribute value to a group of logical access paths implies that any logical access path which is a member of that group needs to have the particular attribute value or an attribute value in a predefined range about the particular attribute value. The logical access path policy may reflect required correspondence relationships between different access paths for example in cases of multiple clustered servers, multiple related independent SAN environments in different physical locations for the purposes of Disaster Recovery (DR), and others.

In step 404 of the process 400, state information is collected from the SAN devices, which will later be used to determine which access paths actually exist and to compute the attribute values for each. Configuration and connection information is collected from all the types of SAN devices, i.e., servers, switches and LUNs. The information collected from each device can include device status, device characteristics, physical connectivity information of the device, and logical configuration set-up state of the device. That information can be represented in different formats by different types of devices. Furthermore the acquisition of these information items from different device types may require different approaches. The validation process obtains that information by using a combination of acquisition methods for each device type including: using device APIs, simulating CLI sessions, utilizing CIM standard protocols, and SNMP protocols In step 406 of process 400, the collected information is standardized, eliminating discrepancies between related information obtained from different sources. The raw information may be represented in different formats and have different semantics and so is standardized to represent uniformly the relevant status, and physical and logical state information from each device.

Contents discrepancies in the standardized information can arise for a number of reasons, such as slight time delays associated with the receipt of information from different distributed devices and different levels of sophistication and reliability of different device types. Such discrepancies can manifest themselves in that, for example, two different devices having different, inconsistent views on the nature of their mutual connection, etc. Such discrepancies are reconciled and resolved by the validation process by relying where possible on the point of time information when particular information items are obtained (and for example preferring later information to earlier conflicting information), and relying on relative weights based on estimated reliability reputations of specific devices for resolution.

In the next step 408, the logical access paths are identified and an abstract graph representation of the SAN can be constructed. The connection and configuration state information from each of the devices can be used in an aggregated process to generate an abstract graph representation of the network representing the logical access paths in the SAN. Each SAN device can be represented as a node in the graph. End-nodes represent applications/servers (source end-points) and storage/LUNs (target end-points). In the first part of the abstract graph construction each edge between nodes represents an existing physical link between the SAN devices (or between a SAN device and a SAN end-points). In the next part of the constructions edges are eliminated in each case of a logical constraint (as defined in a device configuration) which disable flows on that link. The result of this iterative construction is an abstract in which a logical access path exist between one application on a server and a LUN on a storage device exists if and only if a path exist in the abstract graph between the corresponding end nodes. For the sake of process efficiency, the iterative step of graph edge elimination (pruning) based on logical constraints implied by device configuration set-up is performed in a order designed to ensure as much pruning (and so reducing the complexity) as early as possible. For that purpose SAN semantics are utilized to determine the order in which device constraints are considered. For example, a LUN masking constraints on one device which constraints most of the potential flows along the physical paths, may be used to prune the graph before a zoning constraint on another which restricts a smaller number of flows.

In step 410 of process 400, attribute values are computed for each of the existing logical access paths according to the required attributes values specified in the logical access paths policy. The attribute values include, inter alia: level of redundancy; type of redundancy; number of hops; number of allocated ports; component interoperability; proximity constraint; and type of authentication.

The attributes value are computed based on the constructed abstract graph and the SAN device information in the following ways. The "level of redundancy" attribute value is computed by determining the number of graph paths between the given end-points which are independent—that is do not traverse through any joint intermediate device. The algorithm used is an adaptation of known graph algorithms such BFS and Graph Coloring to this particular problem and in a way which is customized to reflect typical SAN topology characteristics (as described above) for optimized execution time. The resulting algorithm is very efficient and has a computational complexity of $O(D^2)$.

The "type of redundancy" attribute is calculated based on the characteristics of the components of the devices in the independent paths (for example whether each intermediate path devices are associated with different SAN fabrics). The "number of hops" attribute of a logical access path is the number of intermediate nodes in the constructed abstract graph. The "number of allocated ports" attribute for a given access path is determined from port allocation information obtained from the devices corresponding to the abstract graph. The "bandwidth" attribute is computed based on the performance characteristics of all the devices and links corresponding to the abstract graph, and determined the end-to-end performance characteristics that may be attained on that logical access path. The "Component Interoperability" attribute is computed based on the device type, models, firmware version and similar information for each device along the path, and reflects potential compatibility conflicts along a logical access path. The "Proximity Constraints" attribute is based on examining all the other logical access paths that intersect with devices in a given access path, and reflects potential security related vulnerabilities (for example if a vulnerable Web application has a logical access path which includes a switch which is also on the logical access path of a very sensitive internal financial application). The "type of authentication" attribute reflects the type of mechanisms (id based, secret based, cryptographic-function, or state signature based) that may be available to authenticate servers and devices along the logical access path, and reflects level of security associated for example with potential spoofing attacks.

The computed logical access paths and their computed attributes are computed with the required state as defined by the logical access path policy. In the following step 412, the process 400 checks if a violation has occurred. A violation is any discrepancy between the computed state and the desired requirement. In particular, there can be three types of violations: 1. A logical access path between an application and a LUN needs to exist but does not. 2 A logical access path need not exist (not specified in the logical access path policy), but does exist. 3. A logical access path needs to exists and does exist, but at least one its computed attribute values is different from the corresponding required value as specified in the logical access path policy.

In addition to the above a policy may typically imply that no partial logical access paths should ever exist. The definition of a partial logical access path is similar to that of a logical access paths but it either does not begin at an application on a server, or does not end at a LUN on a storage device as logical access path always do. For example, a switch which is connected to a storage device and which is zoned to allow flow to a LUN on that device from a certain server, but no such server can generate a flow to the switch, represent a partial access path. Partial logical access paths often exists in SAN as a results of errors, leftovers from migrations process and changes and other reasons and in general represent risk for disruption and security incidents, as well as potentially wasted resources and increased complexity. The identification of a partial logical access path uses an analogous process for identifying logical access paths (as described above) and are represented in the abstract graph as a path which begins or ends at an node which itself is not an end node.

If the process 400 detects a violation, step 412, then the details of the detected violations (of the above three types of violations or a detected partial logical access path ) are added to a violations repository (indicated by reference numeral 18 in FIGS. 1 and 3). Each violation and its context details are notified to the pre-determined recipient based on a pre-specified notification policy (based for example on which applications are affected, what is the type of the violation, etc.), step 314. The notification is performed in a number of communication methods including e-mail message generation, SNMP notification, and others. The process 400 can provide a graphic rendition of the logical access paths, highlight any violations and provide connectivity details down to the device level, step 416.

Figure 5:
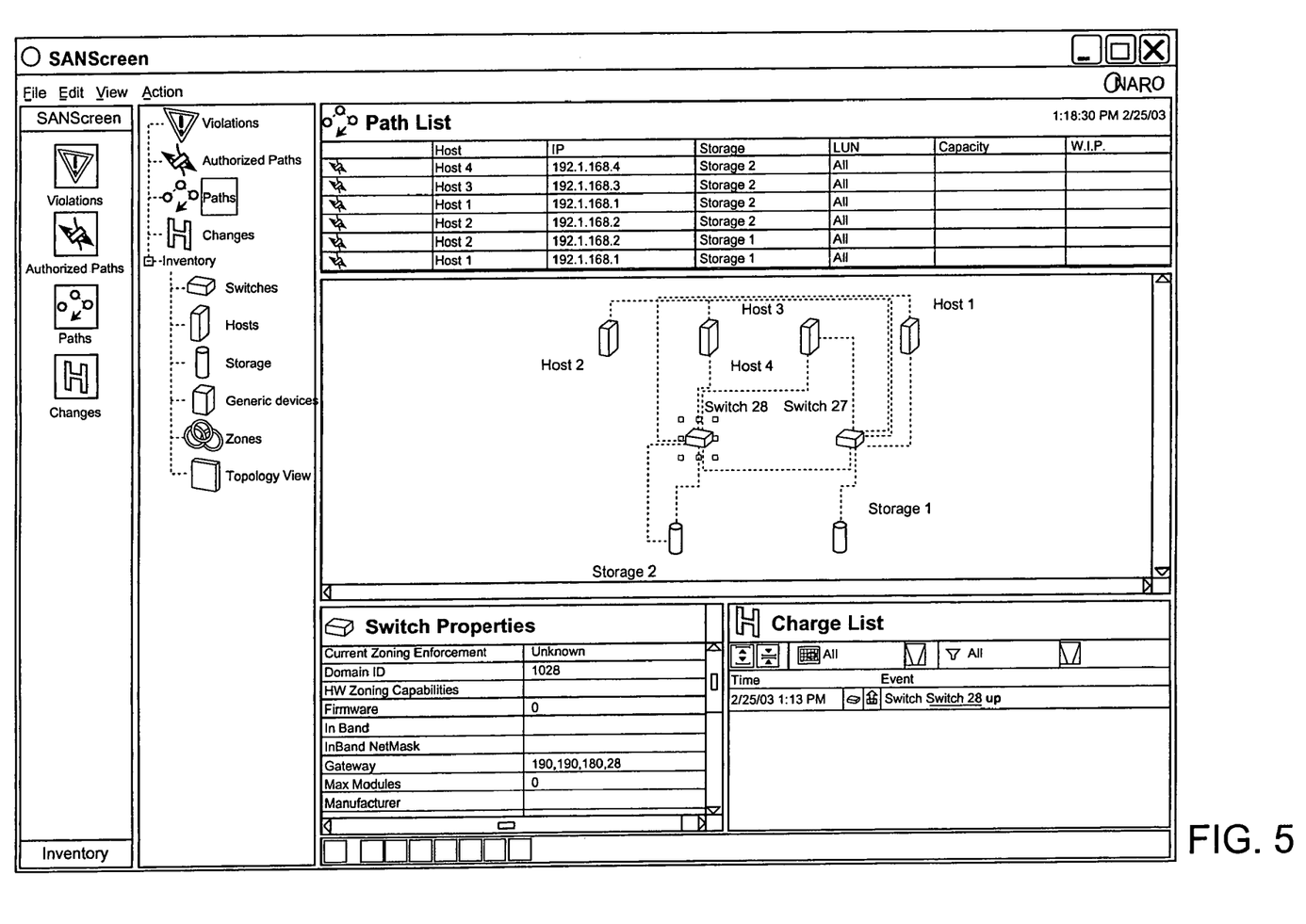
FIG. 5 shows a screen console of the SAN Validation Manager of FIG. 1.

Referring now to FIG. 5, the logical access paths are monitored and validated by a SAN Validation Manager 12 which is in communication with the SAN peripherals through communication channels, for example, via Internet or intranet links, as indicated for exemplary devices in FIGS. 1 and 3 by the dashed lines. The SAN Access Path Manager 12, through these communication channels, interrogates the SAN peripherals and devices and obtains SAN configuration information and displays a topological view on, for example, monitor 14. The SAN Access Path Manager 12 can also obtain detailed information about each of the SAN devices and paths. For example, as depicted in FIG. 5, a detailed property view of a switch may be obtained by clicking on the corresponding switch icon displayed on a topological map of the SAN on monitor 14. Likewise, LUN properties, LUN masks, port attributes, and zone attributes can be visualized. Moreover, a change list can display changes in the configuration of devices. The Access Path Manager 12 can be implemented in software on a server application running, for example, the Linux or Windows® operating system.

Figure 6:
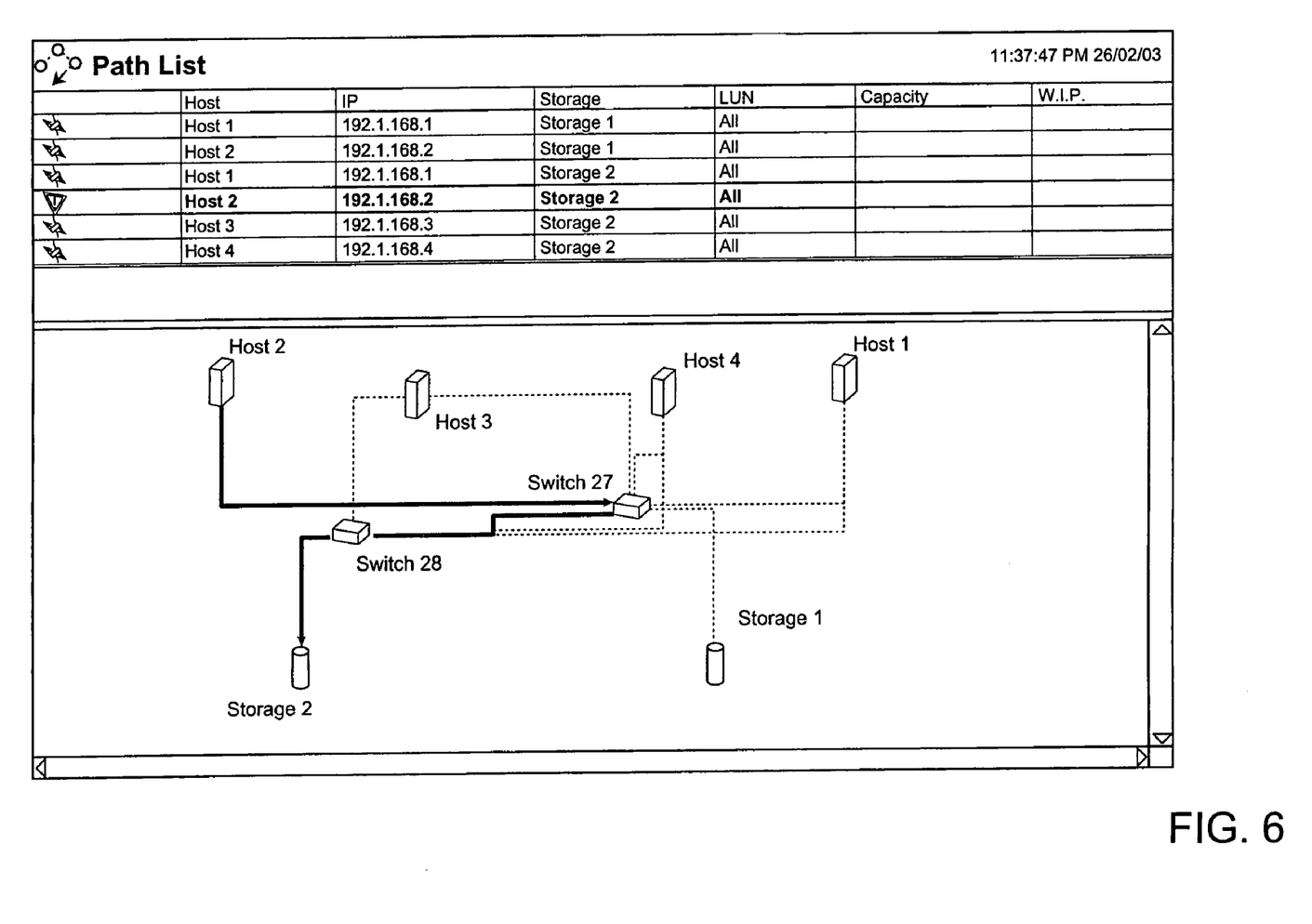
FIG. 6 shows a selection of violating path in a path list table and a topology view.

FIG. 6 shows how a violating logical path in a path list table and can be selected and displayed in a topology view. Following a selection of a logical path in the path list table, clicking on a change list tab displays all the changes that occurred in the SAN and were related to selected logical path. These changes include all the physical actions and configuration changes performed on devices belonging to the selected logical path, all the implications of these actions, such as the logical path appearing or disappearing and changes to the relevant authorized logical path.

The state of the SAN may change frequently for a variety of reasons such as natural growth, enterprise migration processes, enterprise consolidation processes, technology upgrades, infrastructure architectural changes, component failures others. Each individual SAN event which changes some local aspect of the SAN (modifying for example the state of a particular SAN device or a particular link) may affect any number of logical access paths in a variety of ways.

Figure 7:
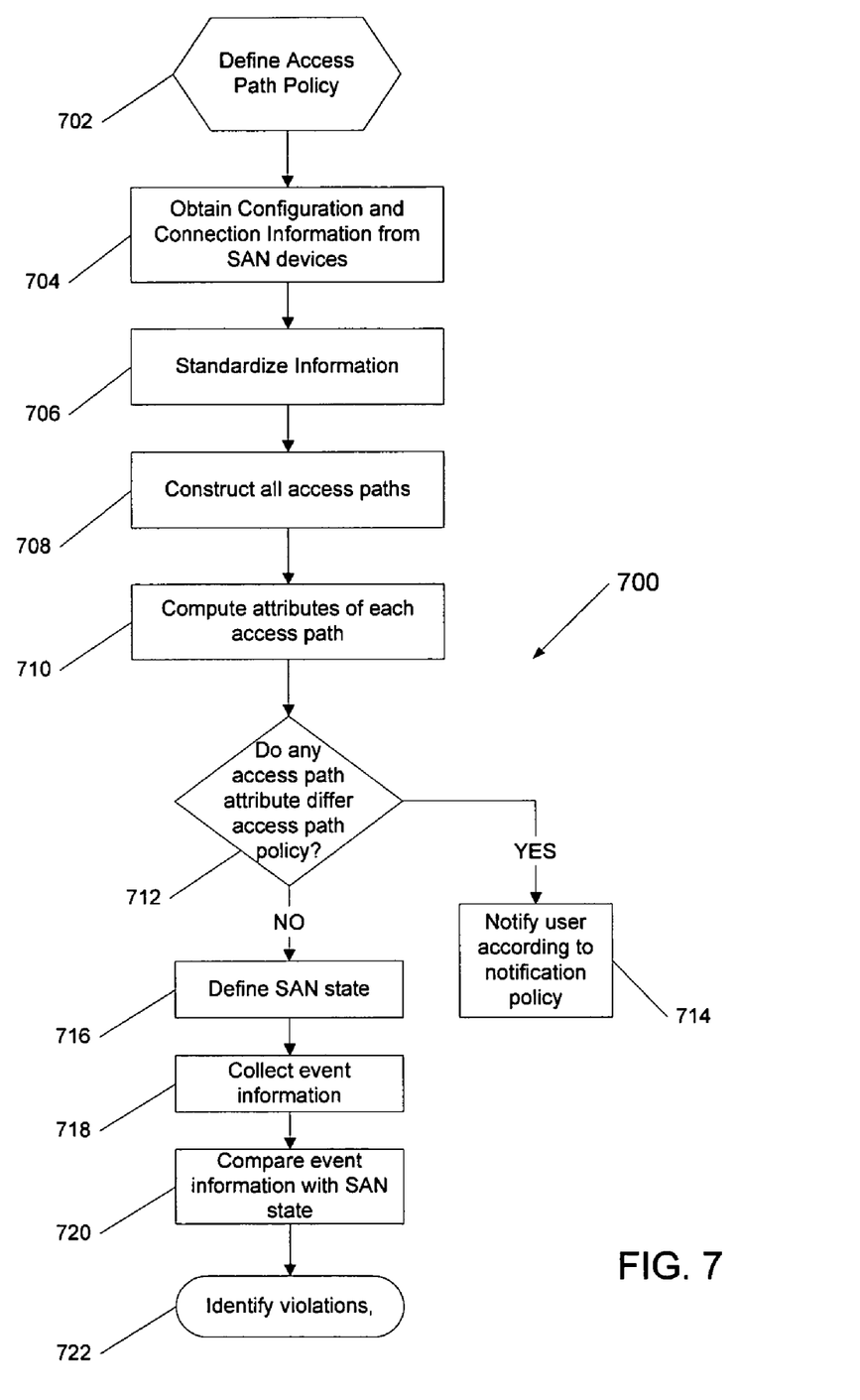
FIG. 7 is a schematic high-level flow diagram for validating an event of a SAN.

Referring now to FIG. 7, a process 700 for validation of SAN events analyzes the impact of each change on any logical access path, and determines compliance with the corresponding policy. Such analysis can be used to determine the impact of any event after it occurred, or to predict the expected impact of an event before it occurs.

Steps 702 to 714 of process 700 are identical to steps 402 to 414 of process 400 depicted in FIG. 4. If process 700 does not detect a violation of access path policy, then a valid SAN state is obtained in step 716. Thereafter, in step 718, the process 700 obtains all the relevant information about an individual SAN change event. The information includes the type of event (including device up or down, link up or down, new device added, device firmware update, device zoning change, device LUN-masking change, and other similar types), the affected device or link (which switch, HBA, server, storage device, link, etc), specific parameters related to the event type (for example, specification of new zoning information, connected ports of a new link, level of new firmware), as well as the time of the event occurrence.

Such information about events that occurred in the SAN are obtained from SAN devices in two possible ways. 1. Periodic polling of each device (at a frequency which can be adjusted) to determine any state change events since the last poll inquiry; 2. Trapping triggered by specific state change at specific devices and which results in the forwarding corresponding event information.

In addition, in various cases, event information may be obtained while the event is still pending and before it has actually occurred. For example if the event is part of a planned change task process, its details can be collected before it is performed, and based on the validation process results the event can be later taken, cancelled, or modified, to ensure compliance with the logical access path policy.

In such cases, a-priori event information (as outlined above) can be obtained in a number of ways. That information can be directly provided by a SAN administrator as intended change details. That information can be obtained by interaction with an external module responsible for SAN device provisioning (such as a software developed for that purpose by EMC Corp.) which can communicate its intended change details before they are invoked. Finally that information can be extracted from some intercepted traffic (for example obtained from some SAN management console), parsing the contents of an on the fly change command to extract the relevant information (and potentially blocking the change command until the completion of the evaluation process).

Information about each individual SAN event (whether it is obtained a-priori or post-priori as described above) is used as an input to determine impact on all the SAN logical access paths and their compliance with the logical access path policy (in the case of a-priori event information the analysis is on simulated SAN state, and in the case of a post-priori event information the analysis is on an actual SAN state), step 720. Each single local change event can cancel any number of logical access paths, can generate any number of new logical access paths, or can change any number of attributes values on any number of access paths.

The analysis of the impact of a change event on the logical access paths is analogous to the logical access path validation process described above. In particular the abstract graph representing the last SAN state is augmented to reflect the new SAN event information in the following way. Events of the type device up or down, or link up or down, are represented as nodes or edges added or deleted respectively. Logical state changes such for example as new zoning or new LUN masking states are represented as addition of new edges or removal of existing edges according to the logic described above.

The resulting abstract graph is used as basis for a logical access path attributes value analysis analogous to that described in the SAN validation process. Similarly the results of that analysis are compared to the logical access paths policy, violations are identified, and appropriate notifications generated, step 722. The change event information are stored in a SAN change repository. Change information with their corresponding SAN logical access path impact can be presented in graphical and tabular form, with appropriate drill down capabilities to the device level. The efficiency of the SAN event validation process and related optimization enable to perform and rapidly complete this process for any event, even in environments in which SAN change events are very frequent.

It is possible to augment the above SAN event validation process by adding a SAN change plan repository which contains pre-specification of planned tasks, and their constituent individual planned SAN change events. Such a change plan can serve a number of useful purposes. It can permit temporary violations for a limited period of time during the execution of a complete task (for example without causing violation notification). Typical tasks such as addition a new application server (and so one or more new logical access paths) to the SAN may include multiple, sometimes 10-20, individual change events, each one often causing some temporary logical access paths violations (which should be resolved when the whole task is completed). Conversely, in many cases it may be desirable to establish the correspondence between actual events and the events specified in the change plan, and identify any deviation with appropriate notification, whether or not these deviations also caused any logical access paths violations. This capability along with the other validation processes described helps increase the control of any SAN change process, increase its efficiency and reduce its risk.

According to another practice of the invention, the authentication of components in SAN logical access paths can be enhanced in a number of ways. Strong authentication can defeat attempts by perpetrators to "spoof"—cause a device to "impersonate" another—in order to gain unauthorized access to data by generating and exploiting an unauthorized logical access path.

An enhanced authentication process includes the following steps:

An initiation key-distribution phase in which each storage-network device is provided reliably with an associated with a globally unique identifier and with corresponding authentication material (such distribution may be repeated as required as part of the SAN logical access path key management life cycle).

As a reaction to pre-determined event circumstances (such a configuration change attempt) an appropriate authentication process is triggered. Depending on the type of device involved and the event circumstances, one or more authentication mechanisms are used to establish that a device claiming a (globally unique) identifier is indeed that authentic device. The mechanisms that are used for this authentication can include one or more of the following: a static secret, a dynamic one-time secret, a cryptographic public/private key, a configuration state, a behavioral pattern profile.

The authentication process can furthermore include providing a secure and authentic channel between devices following the completion of successful validation of device authentication, working in conjunction with any type of storage-area network protocol including Fibre-channel, iScsi, and Infiniband.

To enhance further the integrity and security of the SAN logical access paths a light-weight resident software agent may be deployed at the any of the SAN connected servers. Each agent interact with the SAN validation process over a conventional secure channel. This approach ensures, with high probability, the integrity of the agent even in the face of attempts to modify or forge its identity. The agent is responsible for performing access traffic monitoring, SAN logical access path processing, and authentication functions—without causing performance degradation to the server.

The method and system include software executing processes that:

Ensure the consistency of certain data messages between the servers and the storage networks and if required to take appropriate alerting/blocking action.

Establish the authenticity/integrity of application modules on the corresponding server—using state and behavioral information.

Enforce the consistency between application data access policy and actual access given particular application execution state and a particular access interaction data state.

Assist in authentication the server, and its modules, to the centralized authentication control module.

Ensure the self integrity and preservation of itself in the face of malicious attempts to breach server security.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A process for validating a state of a storage area network (SAN), comprising the steps of:

defining a SAN access path policy representative of SAN logical access paths, said SAN logical access paths defining end-to-end access relationships between an application on a server, a sequence of one or more switches and physical links in the SAN, and data LUNs stored on storage devices in the SAN and having for the logical access paths an associated set of logical access path attributes consisting of at least one of a number of hops within a valid logical access path, a level of end-to-end redundancy for a valid logical access path, and a number of allocated ports for a valid logical access path, wherein the SAN access path policy includes a list of valid access paths and an associated set of access path attributes for the valid access paths, collecting configuration information from devices of the SAN, standardizing formats of the configuration information and reconciling conflicts, processing the collected configuration information to identify the SAN logical access paths, and computing the associated access path attribute values, defining a state of the SAN based on SAN logical access path attribute values associated with the SAN logical access paths, the attribute values consisting of at least one of a number of hops within a valid logical access path, a level of end-to-end redundancy for a valid logical access path, and a number of allocated ports for a valid logical access path, and comparing the identified SAN logical access paths and computed access path attribute values with the list of valid access paths and associated set of access path attributes for the valid access paths in the SAN access path policy to identify any logical access path discrepancies or violations, thereby validating the state of the SAN.

2. The process of claim 1, and further including identifying a logical access path violation if at least one identified SAN logical access path is in disagreement with the list of valid access paths and associated set of access path attributes for the valid access paths in the SAN access path policy.

3. The process of claim 1, and further including defining a SAN notification policy for notifying a user about SAN logical access path violations.

4. The process of claim 3, wherein notifying a user includes sending a message to the user with violation information, said message selected from the group consisting of email, graphic text and SNMP messages.

5. The process of claim 1, and further including identifying partial logical access paths, and comparing logical access path attribute values of the partial paths with the SAN logical access path policy.

6. The process of claim 1, wherein said configuration information includes device properties selected from the group consisting of server ID, server port configuration, switch port configuration, switch ID, switch IP and domain ID, grouping of devices, zoning of devices, storage device ID, LUNs of storage devices, and LUN masks.

7. The process of claim 1, wherein a logical access path attribute further comprises an access path attribute selected from the group further consisting of bandwidth, component interoperability, proximity constraints, and type of component authentication.

8. The process of claim 1, and further comprising user-defined grouping of at least two logical access paths that share at least one of the logical path attribute value or are within a range of predefined logical path attribute values.

9. The process of claim 1, wherein collecting configuration information includes polling a SAN device API, simulating a CLI session with a SAN device, communicating with a SAN device using a CIM or SNMP protocol, or a combination thereof.

10. The process of claim 1, and further comprising validating a change of the SAN state by
collecting SAN event description information, and
processing the SAN event description information to identify SAN logical access paths that have access path attribute values that do not comply with the SAN access path policy, thereby indicating a changed SAN state.

11. A process for validating a state change event of a storage area network (SAN), comprising the steps of:
defining a SAN access path policy representative of SAN logical access paths, said SAN logical access paths defining end-to-end access relationships between an application on a server, a sequence of one or more switches and physical links in the SAN, and data LUNs stored on storage devices in the SAN and having for the logical access paths an associated set of logical access path attributes consisting of at least one of a number of hops within a valid logical access path, a level of end-to-end redundancy for a valid logical access path, and a number of allocated ports for a valid logical access path, wherein the SAN access path policy includes a list of valid access paths and an associated set of access path attributes for the valid access paths,
collecting configuration information from devices of the SAN, standardizing formats of the configuration information and reconciling conflicts,
processing the collected configuration information to identify the SAN logical access paths, and computing the associated logical access oath attribute values,
defining a SAN state based on SAN logical access paths and attribute values associated with the logical access paths consisting of at least one of a number of hops within a valid logical access path, a level of end-to-end redundancy for a valid logical access path, and a number of allocated ports for a valid logical access path,
obtaining SAN event description information, and
comparing the SAN event description information with the SAN state to identify any logical path discrepancies or violations, thereby validating the state change event of the SAN.

12. The process of claim 11, and further defining a SAN change plan and comparing the SAN event description information with the SAN change plan.

13. The process of claim 11, wherein the SAN change event is selected from the group consisting of an erroneous change in a SAN device configuration, a planned change in a SAN device configuration and a device failure.

14. The process of claim 11, wherein the SAN event description is obtained by at least one of polling, trapping after an event occurs, by a direct administrator input, by an input from a provisioning system about an intended change, by intercepting a change command before an event occurs.

15. A storage area network (SAN) validation manager, comprising:
a policy engine that stores a SAN access path policy representative of SAN logical access paths, said SAN logical access paths defining end-to-end access relationship between an application on a server, a sequence of one or more switches and physical links in the SAN, and data LUNs stored on storage devices in the SAN and having for the logical access path attributes an associated set of logical access path attributes consisting of at least one of a number of hops within a valid logical access path, a level of end-to-end redundancy for a valid logical access path, and a number of allocated ports for a valid logical access path, wherein the SAN access path policy includes a list of valid access paths and an associated set of access path attributes for the valid access paths,
a validation engine that collects configuration information from devices of the SAN, standardizes formats of the configuration information and reconciles any conflicts, the validation engine further processing the collected configuration information to identify the SAN logical access paths and computing the associated logical access path attribute values, and comparing the identified SAN logical access paths and computed logical access path attribute values with the list of valid access paths and associated set of access path attributes for the valid access paths in the SAN access path policy to identify any logical access path discrepancies or violations.

16. The SAN validation manager of claim 15, further comprising a change engine that collects SAN event description information, and processes the SAN event information to identify SAN logical access paths that have access path attribute values that do not comply with the SAN access path policy, thereby indicating a changed state of the SAN.

17. The process of claim 1, wherein processing the collected configuration information to identify the SAN logical access paths and computing the associated access path attribute values includes:
constructing a graph representation of the network topology such that each node in the graph represents a device, and each edge represents an information flow capability between two devices, wherein the information flow capability is determined by analyzing a physical communication link between the two devices and logical configuration settings on the two devices.

18. The process of claim 17, wherein identifying the SAN logical access paths and computing the associated access path attribute values further includes:
analyzing the network topology of the constructed graph, wherein analyzing the topology comprises enumerating sequences of edges from nodes representing hosts to nodes representing data on storage devices, and characterizing each node and each edge in terms of the logical configuration setting.

19. The process of claim 18, wherein determining the access path attributes further includes:

analyzing the identified sequences of edges in the constructed graph, enumerating a plurality of distinct logical access paths leading from a first node representing a host to a second node representing data on a storage device, and analyzing at least one of the number of hops, a level of end-to-end redundancy, and the number of allocated ports of each of the logical access paths, wherein the first node and the second node are different nodes.

20. The process of claim 11, wherein processing the collected configuration information to identify the SAN logical access paths and computing the associated access path attribute values includes:

constructing a graph representation of the network topology such that each node in the graph represents a device, and each edge represents an information flow capability between two devices, wherein the information flow capability is determined by analyzing a physical communication link between the two devices and logical configuration settings on the two devices.

21. The process of claim 20, wherein identifying the SAN logical access paths and computing the associated access path attribute values further includes:

analyzing the network topology of the constructed graph, wherein analyzing the topology comprises enumerating sequences of edges from nodes representing hosts to nodes representing data on storage devices, and characterizing each node and each edge in terms of the logical configuration setting.

22. The process of claim 21, wherein determining the access path attributes further includes:

analyzing the identified sequences of edges in the constructed graph, enumerating a plurality of distinct logical access paths leading from a first node representing a host to a second node representing data on a storage device, and analyzing at least one of the number of hops, a level of end-to-end redundancy, and the number of allocated ports of each of the logical access paths, wherein the first node and the second node are different nodes.

23. The process of claim 15, wherein processing the collected configuration information to identify the SAN logical access paths and computing the associated access path attribute values includes:

constructing a graph representation of the network topology such that each node in the graph represents a device, and each edge represents an information flow capability between two devices, wherein the information flow capability is determined by analyzing a physical communication link between the two devices and logical configuration settings on the two devices.

24. The process of claim 23, wherein identifying the SAN logical access paths and computing the associated access path attribute values further includes:

analyzing the network topology of the constructed graph, wherein analyzing the topology comprises enumerating sequences of edges from nodes representing hosts to nodes representing data on storage devices, and characterizing each node and each edge in terms of the logical configuration setting.

25. The process of claim 24, wherein determining the access path attributes further includes:

analyzing the identified sequences of edges in the constructed graph, enumerating a plurality of distinct logical access paths leading from a first node representing a host to a second node representing data on a storage device, and analyzing at least one of the number of hops, a level of end-to-end redundancy, and the number of allocated ports of each of the logical access paths, wherein the first node and the second node are different nodes.

* * * * *